US012166871B2

(12) United States Patent
Chao

(10) Patent No.: US 12,166,871 B2
(45) Date of Patent: Dec. 10, 2024

(54) MITIGATING AGAINST SPURIOUS DELIVERIES IN DEVICE ONBOARDING

(71) Applicant: Dell Products L.P., Round Rock, TX (US)

(72) Inventor: Ching-Yun Chao, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 232 days.

(21) Appl. No.: 18/046,646

(22) Filed: Oct. 14, 2022

(65) Prior Publication Data

US 2024/0129736 A1 Apr. 18, 2024

(51) Int. Cl.
| H04L 9/08 | (2006.01) |
| H04L 9/32 | (2006.01) |
| H04L 9/40 | (2022.01) |
| H04L 67/51 | (2022.01) |
| H04W 12/088 | (2021.01) |
| H04W 88/02 | (2009.01) |

(52) U.S. Cl.
CPC .......... *H04L 9/0866* (2013.01); *H04L 9/3268* (2013.01); *H04L 63/08* (2013.01); *H04L 67/51* (2022.05); *H04W 12/088* (2021.01); *H04W 88/02* (2013.01)

(58) Field of Classification Search
CPC ..... H04L 9/0866; H04L 9/3268; H04L 63/08; H04L 67/51; H04W 12/088; H04W 88/02
See application file for complete search history.

(56) References Cited

U.S. PATENT DOCUMENTS

| 11,522,755 | B1* | 12/2022 | Warkhedi | ................ H04L 67/51 |
| 2017/0366347 | A1* | 12/2017 | Smith | ................ H04L 9/3247 |
| 2019/0349426 | A1* | 11/2019 | Smith | ................ H04L 9/3239 |
| 2020/0186998 | A1* | 6/2020 | Smith | ............... H04W 12/0471 |
| 2023/0413060 | A1* | 12/2023 | Baskaran | ............ H04L 63/0823 |
| 2024/0129136 | A1 | 4/2024 | Chao | |

OTHER PUBLICATIONS

Cooper, et al. "FIDO Device Onboard Specification 1.1" Fido Alliance. [https://fidoalliance.org/specs/FDO/FIDO-Device-Onboard-RD-v1.1-20211214/], Dec. 14, 2021, 114 pages.

\* cited by examiner

*Primary Examiner* — Cheng-Feng Huang
(74) *Attorney, Agent, or Firm* — Amin, Turocy & Watson, LLP

(57) ABSTRACT

A system can access an application programming interface of a device to set an owner authorization cryptographic key on the device. The system can receive, at a device discovery service, a first request from the device for an identifier of the device onboarding service, wherein the first request comprises an indication of possessing the owner authorization cryptographic key. The system can, in response to validating the indication of the owner authorization cryptographic key, send, by the device discovery service, the identifier of the device onboarding service to the device. The system can, in response to receiving, at the device onboarding service, a second request from the device that is based on the identifier of the device onboarding service and demonstrates possession of the owner authorization cryptographic key, provision the device by the device onboarding service. The system can, permit, via the firewall, the device to access a device management service.

20 Claims, 11 Drawing Sheets

500 ⟶

( 502 )

↓

ACCESSING AN APPLICATION PROGRAMMING INTERFACE OF A DEVICE TO SET AN OWNER AUTHORIZATION CRYPTOGRAPHIC KEY ON THE DEVICE 504

↓

RECEIVING, AT A DEVICE DISCOVERY SERVICE OF THE SYSTEM AND VIA A FIREWALL THAT RESTRICTS THE DEVICE TO CONTACTING THE DEVICE DISCOVERY SERVICE AND A DEVICE ONBOARDING SERVICE OF THE SYSTEM BASED ON INDICATION OF DEVICE POSSESSION OF THE OWNER AUTHORIZATION CRYPTOGRAPHIC KEY, A FIRST REQUEST FROM THE DEVICE FOR AN IDENTIFIER OF THE DEVICE ONBOARDING SERVICE, WHEREIN THE FIRST REQUEST COMPRISES AN INDICATION OF POSSESSING THE OWNER AUTHORIZATION CRYPTOGRAPHIC KEY 506

↓

IN RESPONSE TO VALIDATING THE INDICATION OF THE CRYPTOGRAPHIC KEY, SENDING, BY THE DEVICE DISCOVERY SERVICE, THE IDENTIFIER OF THE DEVICE ONBOARDING SERVICE TO THE DEVICE 508

↓

IN RESPONSE TO RECEIVING, AT THE DEVICE ONBOARDING SERVICE, A SECOND REQUEST FROM THE DEVICE THAT IS BASED ON THE IDENTIFIER OF THE DEVICE ONBOARDING SERVICE AND DEMONSTRATES POSSESSION OF THE OWNER AUTHORIZATION CRYPTOGRAPHIC KEY, PROVISIONING THE DEVICE BY THE DEVICE ONBOARDING SERVICE 510

↓

IN RESPONSE TO PROVISIONING THE DEVICE, PERMITTING, VIA THE FIREWALL, THE DEVICE TO ACCESS A DEVICE MANAGEMENT SERVICE 512

RECEIVING, VIA A DEVICE DISCOVERY SERVICE, A REQUEST FROM A DEVICE FOR AN IDENTIFIER OF THE DEVICE ONBOARDING SERVICE, WHEREIN THE REQUEST INDICATES POSSESSION OF AN OWNER AUTHORIZATION CRYPTOGRAPHIC KEY 1004

↓

IN RESPONSE TO VALIDATING THE INDICATION OF THE OWNER AUTHORIZATION CRYPTOGRAPHIC KEY, SENDING, VIA THE DEVICE DISCOVERY SERVICE, THE IDENTIFIER OF THE DEVICE ONBOARDING SERVICE TO THE DEVICE 1006

↓

IN RESPONSE TO RECEIVING, VIA A DEVICE ONBOARDING SERVICE, A REQUEST FROM THE DEVICE THAT IS BASED ON THE IDENTIFIER OF THE DEVICE ONBOARDING SERVICE, PROVISIONING, VIA THE DEVICE ONBOARDING SERVICE, THE DEVICE 1008

MITIGATING AGAINST SPURIOUS DELIVERIES IN DEVICE ONBOARDING

BACKGROUND

An entity can acquire new computing devices for its use, and configure them to be used in its network of devices. There can be protocols to onboard computing devices to a particular entity's device management system. A device management system can be configured to manage the devices in an entity's network of devices.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can access an application programming interface of a device to set an owner authorization cryptographic key on the device. The system can access an application programming interface of a device to set an owner authorization cryptographic key on the device. The system can receive, at a device discovery service of the system and via a firewall that restricts the device to contacting the device discovery service and a device onboarding service of the system based on indication of device possession of the owner authorization cryptographic key, a first request from the device for an identifier of the device onboarding service, wherein the first request comprises an indication of possessing the owner authorization cryptographic key. The system can, in response to validating the indication of the owner authorization cryptographic key, send, by the device discovery service, the identifier of the device onboarding service to the device. The system can, in response to receiving, at the device onboarding service, a second request from the device that is based on the identifier of the device onboarding service and demonstrates possession of the owner authorization cryptographic key, provision the device by the device onboarding service. The system can, in response to provisioning the device, permitting, via the firewall, the device to access a device management service.

An example method can comprise accessing, by a system comprising a processor, an application programming interface of a device to apply an owner authorization cryptographic key for use by the device. The method can further comprise facilitating, by the system, receiving, via a device discovery service, a request from the device for an identifier of a device onboarding service, wherein the request indicates possession of the owner authorization cryptographic key. The method can further comprise, in response to validating the indication of the owner authorization cryptographic key, facilitating, by the system, sending, via the device discovery service, the identifier of the device onboarding service to the device. The method can further comprise, in response to receiving, via the device onboarding service, a request from the device that is based on the identifier of the device onboarding service, facilitating, by the system, provisioning, via the device onboarding service, the device.

An example non-transitory computer-readable medium can comprise instructions that, in response to execution, cause a system comprising a processor to perform operations. These operations can comprise receiving, via a device discovery service, a request from a device for an identifier of the device onboarding service, wherein the request indicates possession of an owner authorization cryptographic key. These operations can further comprise, in response to validating the indication of the owner authorization cryptographic key, sending, via the device discovery service, the identifier of the device onboarding service to the device. These operations can further comprise in response to receiving, via a device onboarding service, a request from the device that is based on the identifier of the device onboarding service, provisioning, via the device onboarding service, the device.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 5 illustrates another example process flow that can facilitate mitigating against spurious deliveries in device onboarding, in accordance with an embodiment of this disclosure;

FIG. 10 illustrates another example process flow that can facilitate mitigating against spurious deliveries in device onboarding, in accordance with an embodiment of this disclosure;

DETAILED DESCRIPTION

Overview

Figure 1:
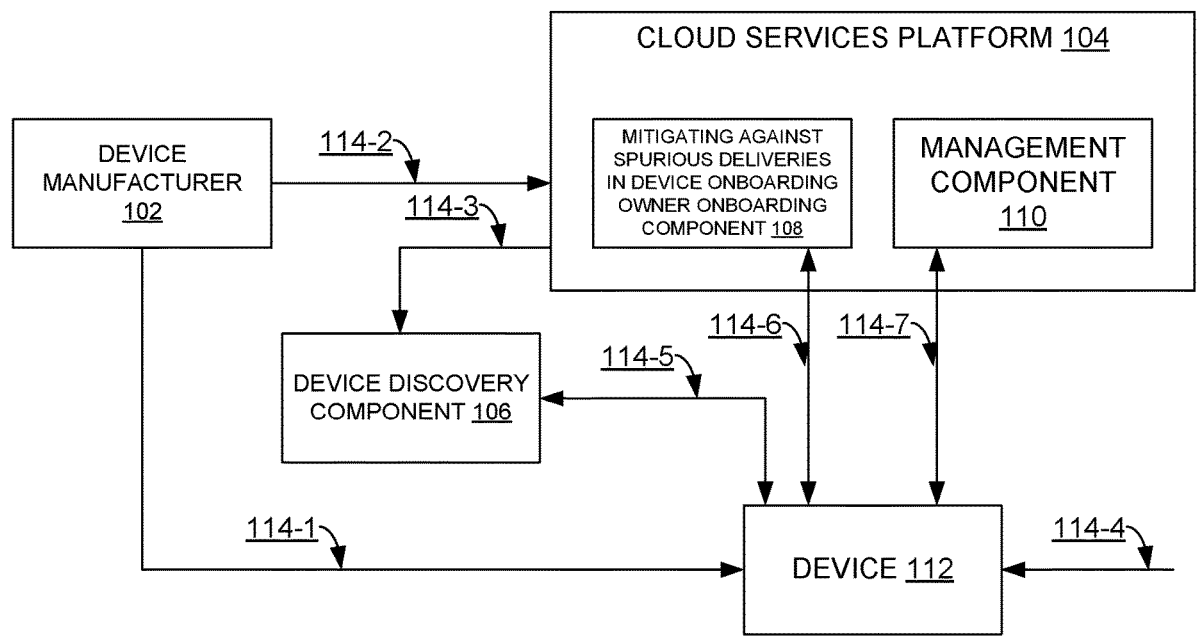
FIG. 1 illustrates an example system architecture that can facilitate mitigating against spurious deliveries in device onboarding, in accordance with an embodiment of this disclosure.

The present techniques can generally be implemented as part of a device onboarding protocols. Examples described herein generally refer to a Fast Identification (ID) Online (FIDO) Device Onboarding (FDO) protocol, and it can be appreciated that the present techniques can be applied to a variety of protocols. An FDO protocol can comprise device onboarding automation technology. FDO can generally be designed to be a zero-touch onboarding solution that aims to streamline an Internet of Things (IoT) supply chain from a manufacturing factory to a cloud service provider or a device management platform, with auto-provisioning at a target destination via late binding. FDO can use public key management technology to provide verifiable security protection through the supply chain.

When manufactures build a device, they can also generate a digital owner voucher. It can be that the ownership voucher is not shipped with the device. A device and the ownership voucher can be cryptographically linked together using public key technology. In some examples, a private key, which can be generated on the device, never leaves the device. In some examples, the private key can be generated and stored in a Trusted Platform Module (TPM) chip soldered on the motherboard of the device. A public certificate for the public key, according to an International Telecommunication Union X.509 standard, can be signed by a trusted certificate authority. This certificate can be stored in the ownership voucher.

In some examples, a private key kept on a device can be referred to as an "owner authorization key" to distinguish it from other cryptographic keys that can be stored on the device.

When users, e.g., cloud service providers, device management service providers, etc., order a device, they can get the ownership voucher that contains their public key signed by seller. Their ownership vouchers can be used to prove the user's ownership of the device. The device can then be delivered to the owner.

In the meantime, the owner can register the new owner onboarding service and other information for the device in a Rendezvous computer networking service, which can be used by devices to find each other, and can generally be called a device discovery service.

When the device is powered on and plugged into the user's network, the device can try to connect to the device discovery service using an Internet Protocol (IP) address that is preconfigured in the device.

Once connected to the device discovery service, a device can retrieve the ownership voucher, and verify the certificate in the ownership voucher. Using information provided by the user along with the ownership voucher in the device discovery service, a device can initiate an onboarding protocol with the user, e.g., a cloud service provider. Here, the device user can verify whether the device does have the matching private key, and the device can verify whether the user has the matching signer key of the ownership voucher.

If both validations are successful, the user can establish a trust relationship with the device and start device management.

When manufactures build a device, they can also generate a digital owner voucher.

FDO onboarding protocols can be protected by public key technology, as described above. Even so, there can be a weakness in the FDO onboarding process. This weakness can occur in cases when a device is shipped to a spurious location (that is, user), and when a spurious device is shipped to an unsuspected user. A device, when initially powered on by the user and joining a network of the user can use a preconfigured IP address in the device to find the device discovery service, as described above. The device then obtains the IP address of the owner services using information provided by the owner from the device discovery service. If the device discovery service can be reached by the device, then the device can continue the onboarding process and gain access to the user's resource. While users can be advised to set firewall policy to protect their User Onboard Service from a spurious device, it can be that this is not always be feasible. It can also be that that users failed to setup their firewall policy, which can cause an unintended exposure.

Mitigation approaches can include printing an identifier on the device or the package, such as a bar code or a quick response (QR) code on the device or the device's package. Uses can scan the code/identifier to validate whether the device is legitimate. Where this approach can work to mitigate against spurious devices, it can defeat a goal of zero-touch onboarding.

Another mitigation approach can comprise automating scanning the code/identifier to a mobile phone, and pairing a device with the phone, to let the device validate whether the code/identifier is correct. This approach can rely on device validation, where putting this trust into a device that is not yet validated can be dangerous.

Another mitigation approach can comprise setting up a router and proxy server for onboarding to control device network access. Like with the other mitigation approaches described, this can involve additional configuration and resource requirements, and additional steps that can lead to human errors. Additionally, allowing a spurious device to connect to a network can be more likely when a user places many devices in one order. That is, receiving 5,000 boxes of devices can increase a likelihood of missing a spurious device in one of those boxes compared to receiving 50 boxes of devices.

The present techniques can be implemented to facilitate avoiding spurious deliveries in device onboarding protocols, in a manner that can be secure, can be automated, and can handle large number of devices.

These problems with FDO can stem from FDO building trust entirely between the device and an ownership voucher digital signing service that provides an ownership voucher. It can be that validating a trust relationship occurs after the device connects to the user's network and contacts the device discovery service. A problem can be that, before validating the trust relationship, an untrusted device is allowed to access a user's network resources. In other words, FDO design can violate a zero-trust architecture principle that there be no intrinsic trust. Rather, in a zero-trust architecture, it can be that all users, devices, and systems must be authenticated and authorized to access resources. In contrast, FDO permits an untrusted device network access before authenticating and validating the device.

Prior approaches can either add resource access controls without checking device trustworthiness, or check device codes/identifiers using manual and unreliable approaches. Setting firewall rules and adding dedicated routers/proxy servers is an approach to enforcing access control without checking device authenticity and authorization. Attaching a QR code or other identifiers to the device or the device's package can be vulnerable. That is, prior approaches can violate zero-trust architecture principles.

The present techniques can be implemented to continuously authenticate devices, and to allow resource access in proportion to how much a device is trusted.

One approach according to the present techniques can involve putting a new device behind a firewall and proxy server that allow only authorized traffics to connect to the device discovery service and User Onboarding Service. This approach can align with the Zero-Trust Architecture principles. Being put on an isolated network guarded by firewall rules, it can be that there are only limited resources accessible by a device, namely the device discovery service and the User Onboard Service network resources, which a device can be allowed to access provided its traffics satisfy authorization requirements. Spurious devices that have been delivered incorrectly to this user, and which intend to use device discovery service and user onboarding service without owner authorization are not allowed.

Another approach according to the present techniques can involve authorizing device traffics. It can be that device traffics are authorized only if such traffics are signed or encrypted by keys that only the user would know. It can be that keys embedded in the device or keys derived from identifiers embedded in the device are not acceptable because the device is not trusted yet, and therefore keys and information in the device is not trusted. At this point, it can be that things that can be trusted are those things that only a user would know, and no devices could know.

An approach can be for the user to use a Hash-Based Message Authentication Code (HMAC). With a HMAC, it can be that a device encrypts messages using a symmetric key provided by the user, and generates a hash. A proxy server can validate a HMAC hash value, and allow only validated messages to access network resources (e.g., the device discovery service and the User Onboarding Service). The symmetric key can be shared with the device discovery service and User Onboarding service. It can be that symmetric keys are not never leave the device discovery service and User Onboarding Service. It can be that devices that are delivered to a spurious location will not know the symmetric key, and therefore their traffics will be rejected by the device discovery service and Owner Onboarding Service.

In some examples, other encryption and signing methods can be used to deliver similar results according to the present techniques.

At this point, it can be that only authenticated and authorized traffics are allowed to access network resources (e.g., the device discovery service, and User Onboarding Service). However, it can be that entering symmetric key to these devices is not automated, and this effort is linear proportion to the number of devices. That is, it does not scale.

A FDO specification can establish a strong cryptographical linkage between a device and its digital ownership voucher document. A fundamental problem can be that there is no cryptographical linkage between a device and its user. Hence, there can be a problem that a device can onboard itself regardless of being delivered to the right user. The present techniques can be implemented to resolve this problem by creating a cryptographical linkage between a device and its user using a secret that only the actual user would know. In some examples, a user registers a secret in step 3 when registering to the Owner Onboarding Process. The device discovery server can validate whether a device knows the secret. An onboarding process can be allowed only where a device successfully demonstrates that it has possession of the secret. Where a device is delivered to the wrong location, it would not have this secret.

That is, this approach can involve using a secret only the user knows to guard against unauthorized device onboarding when a device is shipped to the wrong place. This approach can resolve a known security problem in FDO techniques.

Another approach according to the present techniques can involve each device providing an application programming interface (API) endpoint that listens to request to set a symmetric key. A user can use a computer command to transfer data according to a particular protocol (e.g., a curl command) to set the symmetric key. This can allow the onboard process to be automated. When a proxy server detects traffics from a device that is not encrypted and signed with the correct key, and no key has been set, then the proxy server can call the device API to set the owner authorization key.

These approaches according to the present techniques can protect the FDO onboard process from spurious deliveries, regardless of whether the case was a spurious device was received or a device was delivered to a spurious location. The present techniques can be implemented to resolve a fundamental problem of FDO, and can align to principles of a zero-trust architecture.

In prior approaches, user can be advised to set firewall policy to protect their User Onboarding Service from a spurious device, but it can be that this is not always be feasible. There can also be a possibility that users failed to setup their firewall policy and cause an unintended exposure.

As described above, there can be other approaches:

Print a QR code, bar code, or some other identifier on the device or on the package. Users can scan the code/identifier to validate if the device is legitimate. The added manual step involved with this approach would defeat the goal of zero-touch onboarding.

Use the code/identifier as above, and add automation by scanning the code/identifier to a mobile phone, and pair a device with that phone, to let the device validate where the code/identifier is correct. This approach can rely on device validation. Putting this level of trust on a device that is not yet validated can be dangerous.

Setup a router and proxy server for the onboarding purpose to control device network access.

A commonality of the three approaches is they add additional configuration and resource requirements, and additional steps that can lead to human errors. Moreover, allowing spurious device connections to a network can be more likely to happen when users place many devices in one order. That is, when receiving 5,000 boxes of devices, it can be more likely to miss one or more spurious devices as compared to when receiving 50 boxes of devices.

Example Architectures

FIG. 1 illustrates an example system architecture 100 that can facilitate mitigating against spurious deliveries in device onboarding, in accordance with an embodiment of this disclosure.

System architecture 100 comprises device manufacturer 102, cloud services platform 104, device discovery component 106, mitigating against spurious deliveries in device onboarding owner onboarding component 108, management component 110, and device 112. In onboarding device 112, various operations can occur—operation 114-1, operation 114-2, operation 114-3, operation 114-4, operation 114-5, operation 114-6, and operation 114-7.

Figure 11:
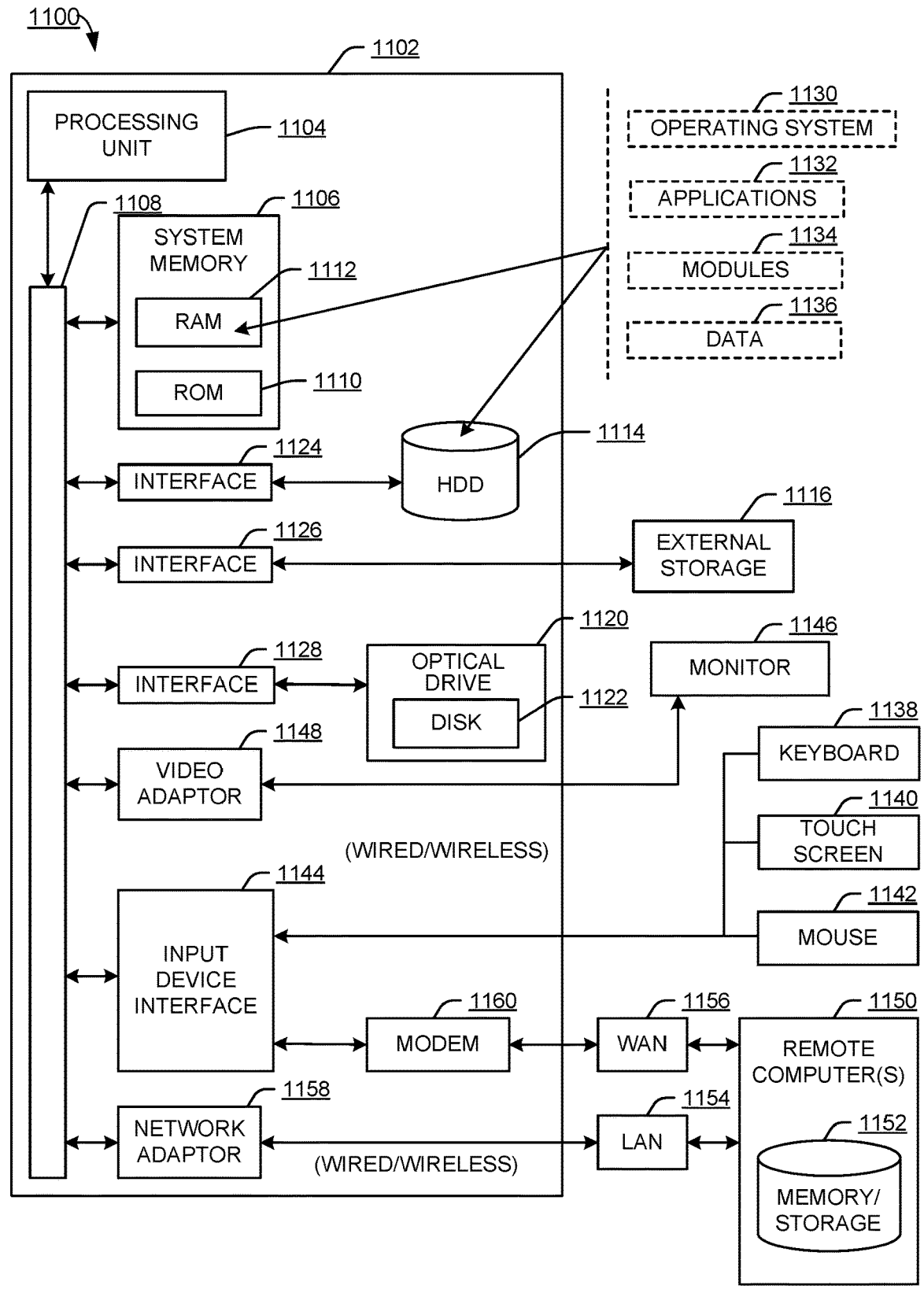
FIG. 11 illustrates an example block diagram of a computer operable to execute an embodiment of this disclosure.

Each of device manufacturer 102, cloud services platform 104, device discovery component 106, mitigating against spurious deliveries in device onboarding owner onboarding component 108, management component 110, and/or device 112 can be implemented with part(s) of computing environment 1100 of FIG. 11.

Device manufacturer 102 can manufacture device 112, which can be a type of computer. Cloud services platform 104 can provide cloud computing resources to users, such as computer storage or compute resources. Device discovery component 106 can implement a device discovery service so that a device connected to a same network as device discovery component 106 can use the device discovery service to discovery other services on the network such as those provided by mitigating against spurious deliveries in device onboarding owner onboarding component 108.

Mitigating against spurious deliveries in device onboarding owner onboarding component 108 can be configured to implement an owner onboarding service that provisions new devices that are added to the network so that they can operate on the network (here, as part of cloud services platform 104), such as by installing files and/or scripts on the device.

Management component 110 can be configured to manage devices on a network, such as by updating them. Device 112 can be a computing device that can be manufacturer by device manufacturer 102 and that becomes part of cloud services platform 104.

As part of onboarding device 112 to cloud services platform 104, various operations can be performed. In operation 114-1, device manufacturer 102 manufactures device 112. In operation 114-2, device manufacturer 102 generates and signs an ownership voucher. This ownership voucher is transmitted to cloud services platform 104, which loads and stores it. In operation 114-3, cloud services platform 104 registers ownership of device 112 with device discovery component 106, using information from the ownership voucher from operation 114-2. This can comprise part of a symmetric key.

In operation 114-4, another part of the symmetric key is loaded onto device 112. In some examples, device 112 can implement an application programming interface endpoint that listens to requests to set a symmetric key on device 112. An owner can use a computer command to set the symmetric key on device 112 in response to determining that device 112 is powered on and on a network of the owner (e.g., cloud services platform 104). This approach can facilitate the onboarding process being automated. When cloud services platform 104 (e.g., via a proxy server) detects traffic from a device is not encrypted and signed with a correct key, and no key has been set on device 112, then cloud services platform 104 can call the device's application programming interface to set the owner authorization key.

On operation 114-5, device 112 is powered on while connected to a network of cloud services platform 104, and device 112 contacts device discovery component 106, which provides device 112 with an identifier of mitigating against spurious deliveries in device onboarding owner onboarding component 108 (e.g., an IP address of mitigating against spurious deliveries in device onboarding owner onboarding component 108).

In operation 114-6, device 112 communicates with mitigating against spurious deliveries in device onboarding owner onboarding component 108 to onboard device 112 to cloud services platform 104. In operation 114-7, device 112 and management component 110 communicate to effectuate management of device 112 as part of cloud services platform 104.

In some examples, mitigating against spurious deliveries in device owner onboarding component 108 can implement part(s) of the process flows of FIGS. 2-10 to implement mitigating against spurious deliveries in device onboarding.

It can be appreciated that system architecture 100 is one example system architecture for mitigating against spurious deliveries in device onboarding, and that there can be other system architectures that facilitate mitigating against spurious deliveries in device onboarding.

Example Process Flows

Figure 2:
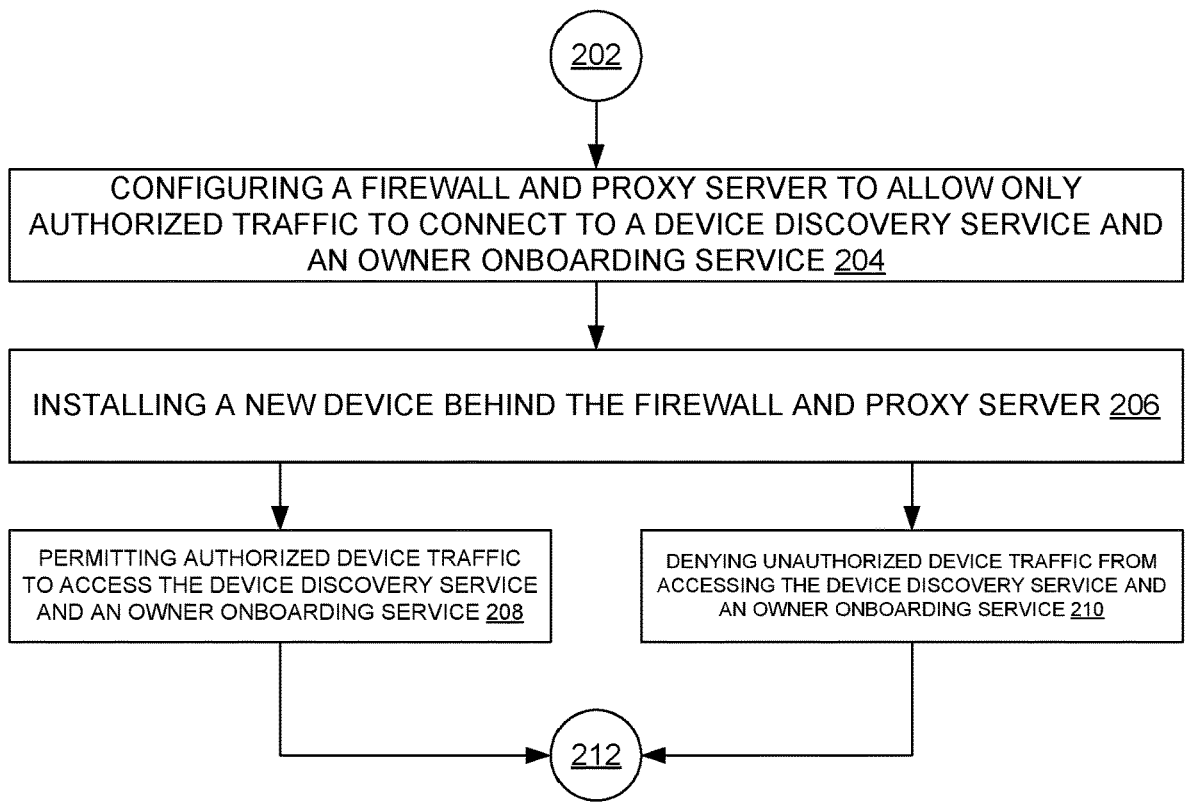
FIG. 2 illustrates an example process flow that can facilitate mitigating against spurious deliveries in device onboarding, in accordance with an embodiment of this disclosure.

FIG. 2 illustrates an example process flow 200 that can facilitate mitigating against spurious deliveries in device onboarding, in accordance with an embodiment of this disclosure. In some examples, one or more embodiments of process flow 200 can be implemented by system architecture 100 of FIG. 1, or computing environment 1100 of FIG. 11.

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10.

Process flow 200 begins with 202, and moves to operation 204. Operation 204 depicts configuring a firewall and proxy server to allow only authorized traffic to connect to a device discovery service and an owner onboarding service. This can be a firewall and proxy server of cloud services platform 104 of FIG. 1.

After operation 204, process flow 200 moves to operation 206.

Operation 206 depicts installing a new device behind the firewall and proxy server. This can be device 112 of FIG. 1.

After operation 206, process flow 200 moves to operation 208 and operation 210.

Operation 208 depicts permitting authorized device traffic to access the device discovery service and an owner onboarding service. Using the example of FIG. 1, authorized traffic can be traffic from a device on which an owner authorization key has been installed, as in operation 114-4 of FIG. 1. Traffic can be authorized where it is originated from a device that can demonstrate possession of a recognized owner authentication key (where the entity implementing operation 208 possesses a corresponding public key that can validate data encrypted with the owner authentication key).

After operation 208, process flow 200 moves to 212, where process flow 200 ends.

Operation 210 is reached from operation 206. Operation 210 depicts denying unauthorized device traffic from accessing the device discovery service and an owner onboarding service. Using the example of FIG. 1, unauthorized traffic can be traffic from a device on which an owner authorization key has not been installed, as in operation 114-4 of FIG. 1.

After operation 210, process flow 200 moves to 212, where process flow 200 ends.

In this manner, process flow 200 can align with zero-trust architecture principles. New devices can be put on an isolated network that is guarded by firewall rules, and where there are limited resources, such as a device discovery service and an owner onboarding service (e.g., services from device discovery component 106 and mitigating against spurious deliveries in device onboarding owner onboarding component 108 of FIG. 1).

It can be that devices are permitted to access these resources only where traffic from these devices satisfies authorization requirements. Similarly, spurious devices that are incorrectly delivered can be denied access to these services (and other resources of the owner).

Figure 3:
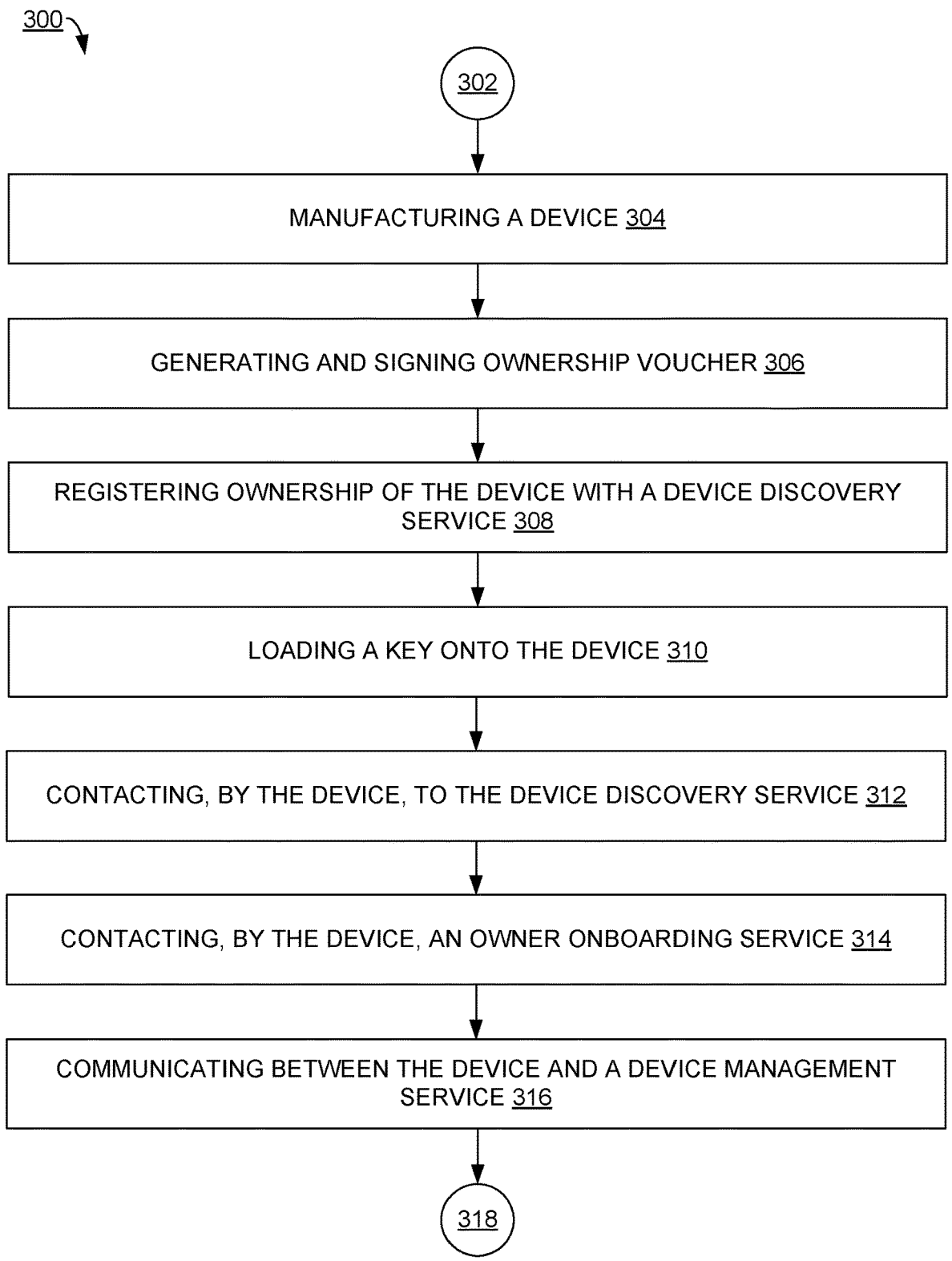
FIG. 3 illustrates another example process flow that can facilitate mitigating against spurious deliveries in device onboarding, in accordance with an embodiment of this disclosure.

FIG. 3 illustrates an example process flow 300 that can facilitate mitigating against spurious deliveries in device onboarding, in accordance with an embodiment of this disclosure. In some examples, one or more embodiments of process flow 300 can be implemented by system architecture 100 of FIG. 1, or computing environment 1100 of FIG. 11.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 200 of FIG. 2, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10.

Process flow 300 begins with 302, and moves to operation 304. Operation 304 depicts manufacturing a device. In some examples, operation 304 can be implemented in a similar manner as operation 114-1 of FIG. 1.

After operation 304, process flow 300 moves to operation 306.

Operation 306 depicts generating and signing ownership voucher. In some examples, operation 306 can be implemented in a similar manner as operation 114-2 of FIG. 1.

After operation 306, process flow 300 moves to operation 308.

Operation 308 depicts registering ownership of the device with a device discovery service. In some examples, operation 304 can be implemented in a similar manner as operation 114-3 of FIG. 1. In some examples, operation 308 can comprise a device owner registering an owner authorization key to a device discovery service.

After operation 308, process flow 300 moves to operation 310.

Operation 310 depicts loading an owner authorization key onto the device. In some examples, operation 310 can be implemented in a similar manner as operation 114-4 of FIG. 1. In some examples, operation 310 can comprise a device owner setting (or storing) an owner authorization key on the device.

After operation 310, process flow 300 moves to operation 312.

Operation 312 depicts contacting, by the device, to the device discovery service. In some examples, operation 312 can be implemented in a similar manner as operation 114-5 of FIG. 1. In some examples, operation 312 can comprise a device discovery service validating that the device has possession of the owner authorization key.

After operation 312, process flow 300 moves to operation 314.

Operation 314 depicts contacting, by the device, an owner onboarding service. In some examples, operation 314 can be implemented in a similar manner as operation 114-6 of FIG. 1. In some examples, operation 314 comprises an owner onboarding service validating that the device has possession of the owner authorization key.

After operation 314, process flow 300 moves to operation 316.

Operation 316 depicts communicating between the device and a device management service. In some examples, operation 316 can be implemented in a similar manner as operation 114-7 of FIG. 1.

After operation 316, process flow 300 moves to 318, where process flow 300 ends.

Process flow 200 of FIG. 2 can be implemented to permit only authorized devices to access certain computing resources, and process flow 300 can be implemented so that devices can be authenticated to be authorized.

Figure 4:
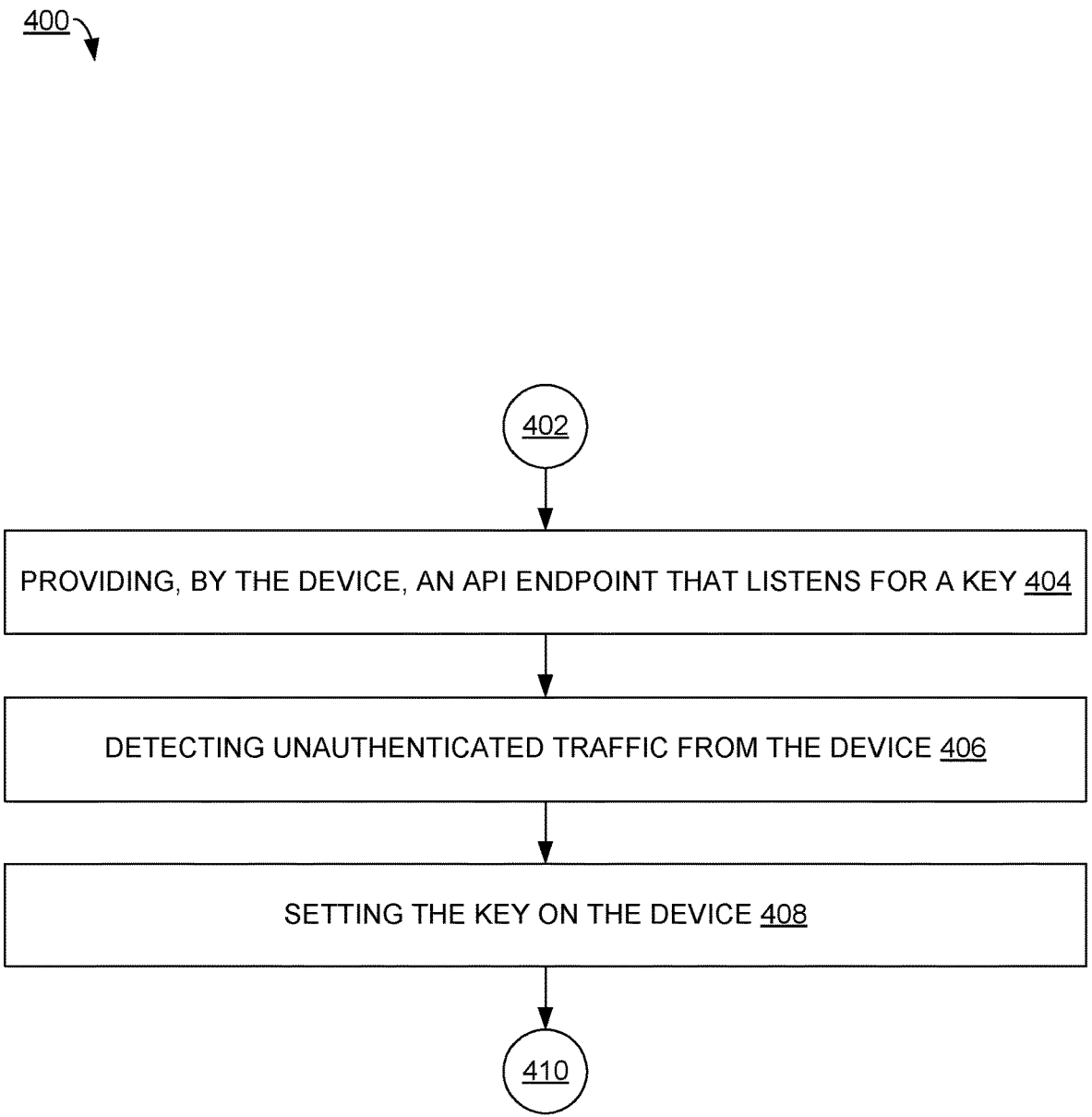
FIG. 4 illustrates another example process flow that can facilitate mitigating against spurious deliveries in device onboarding, in accordance with an embodiment of this disclosure.

FIG. 4 illustrates an example process flow 400 that can facilitate mitigating against spurious deliveries in device onboarding, in accordance with an embodiment of this disclosure. In some examples, one or more embodiments of process flow 400 can be implemented by system architecture 100 of FIG. 1, or computing environment 1100 of FIG. 11.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 200 of FIG. 2, process flow 300 of FIG. 3, process flow 500 of FIG. 5, process flow 600 of FIG. 6, process flow 700 of FIG. 7, process flow 800 of FIG. 8, process flow 900 of FIG. 9, process flow 1000 of FIG. 10.

Process flow 400 begins with 402, and moves to operation 404.

Operation 404 depicts providing, by the device, an API endpoint that listens for an owner authorization key. Using the example of FIG. 1, device 112 can be configured to provide an API endpoint when powered on that listens for messages to set an owner authorization key on device 112.

After operation 404, process flow 400 moves to operation 406.

Operation 406 depicts detecting unauthenticated traffic from the device. This can be performed by cloud services platform 104 of FIG. 1, and/or device discovery component 106. In some examples, authenticated traffic can be network traffic signed with a symmetrical key by an originated device, where device discovery component 106 possesses a matching symmetrical key. Unauthorized traffic can be network traffic that does not have this characteristic. In some examples, to be authorized traffic, traffic from a device must demonstrate it has possession of the owner authorization key for the device, and traffic that lacks this characteristic can be determined to be unauthorized traffic.

After operation 406, process flow 400 moves to operation 408.

Operation 408 depicts setting the owner authorization key on the device. In some examples, this can be performed in a similar manner as operation 114-4 of FIG. 1, using the API endpoint provided as part of operation 404. In some examples, prior to device onboarding, an owner authorization key must be set for the device.

After operation 408, process flow 400 moves to 410, where process flow 400 ends.

Process flow 400 can be used to set an owner authorization key on a device, so that that device can authenticate as part of process flow 300 of FIG. 3, and then access certain computing resources as part of process flow 200 of FIG. 2.

FIG. 5 illustrates an example process flow 500 that can facilitate mitigating against spurious deliveries in device onboarding, in accordance with an embodiment of this disclosure. In some examples, one or more embodiments of process flow 500 can be implemented by system architecture 100 of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 200 of FIG. 2, process flow 300 of FIG. 3, process flow 400 of FIG. 4, process flow 600 of FIG. 6, process flow 700 of FIG. 7, process flow 800 of FIG. 8, process flow 900 of FIG. 9, process flow 1000 of FIG. 10.

Process flow 500 begins with 502, and moves to operation 504.

Operation 504 depicts accessing an application programming interface of a device to set an owner authorization cryptographic key on the device. That is, the device can open an API endpoint that a new owner uses to install an owner authorization key on the device. This can be implemented in a similar manner as operation 404 of FIG. 4.

In some examples, operation 504 comprises sending a message to the application programming interface that identifies a uniform resource locator of the device and the owner authorization cryptographic key. In some examples, accessing the application programming interface of the device to set the owner authorization cryptographic key on the device is performed via a curl command.

After operation 504, process flow 500 moves to operation 506.

Operation 506 depicts receiving, at a device discovery service of the system and via a firewall that restricts the device to contacting the device discovery service and a device onboarding service of the system based on indication of device possession of the owner authorization cryptographic key, a first request from the device for an identifier of the device onboarding service, wherein the first request comprises an indication of possessing the owner authorization cryptographic key. That is, the device can contact a device discovery service for an IP address or URL of an owner onboarding service. Additionally, there can be a firewall that restricts the device to accessing those two services. Using the example of FIG. 1, device 112 can contact device discovery component 106 as in operation 114-5.

In some examples, a firewall and proxy can restrict the device to contacting the device discovery service based on a device demonstrating its possession of an owner authorization key (where the cryptographic key can be an owner authorization key).

After operation 506, process flow 500 moves to operation 508.

Operation 508 depicts, in response to validating the indication of the owner authorization cryptographic key, sending, by the device discovery service to the device, the identifier of the device onboarding service. Using the example of FIG. 1, device discovery component 106 can validate an owner authorization key received from device 112 as part of operation 114-5, and instruct device 112 how to contact mitigating against spurious deliveries in device onboarding owner onboarding component 108.

In some examples, validating the indication of the owner authorization cryptographic key is performed according to a keyed-hash message authentication code approach. A keyed-hash message authentication code approach can involve a message authentication code that uses a cryptographic hash function along with a secret owner authorization cryptographic key.

In some examples, the device is a first device, a second device performs the accessing of the application programming interface of the first device to set the first copy of the shared secret on the first device. In such examples, operation 508 can comprise receiving, by the device discovery service, the second copy of the shared secret from the second device. That is, one entity (e.g., an owner of the device and the network to which the device will be onboarded) can set a copy of the shared secret at both the device and the device discovery service.

In some examples, the owner authorization cryptographic key comprises a first copy of a shared secret, and the device discovery service stores a second copy of the shared secret. That is, a symmetrical key can be used. In the example of FIG. 1, device 112 can have a copy of the symmetrical key, and device discovery component 106 can have another copy of the symmetrical key.

In some examples, the indication of the shared secret comprises a result of processing the first copy of the shared secret with a hash. That is, using the example of FIG. 1, it can be that device 112 does not send its copy of the symmetrical key to device discovery component 106. Rather, device 112 hashes its copy of the symmetrical key and sends the hash. This can increase security where a copy of the owner authorization key is not transmitted, so cannot be captured during transmission.

After operation 508, process flow 500 moves to operation 510.

Operation 510 depicts, in response to receiving, at the device onboarding service, a second request from the device that is based on the identifier of the device onboarding service and demonstrates possession of the owner authorization cryptographic key, provisioning the device by the device onboarding service. Using the example of FIG. 1, as part of operation 114-6, device 112 can contact mitigating against spurious deliveries in device onboarding owner onboarding component 108, which can provision device 112 for use by cloud services platform 104.

After operation 510, process flow 500 moves to operation 512.

Operation 512 depicts, in response to provisioning the device, permitting, via the firewall, the device to access a device management service. This can be a service provided by management component 110 of FIG. 1.

After operation 510, process flow 500 moves to 514, where process flow 500 ends.

Figure 6:
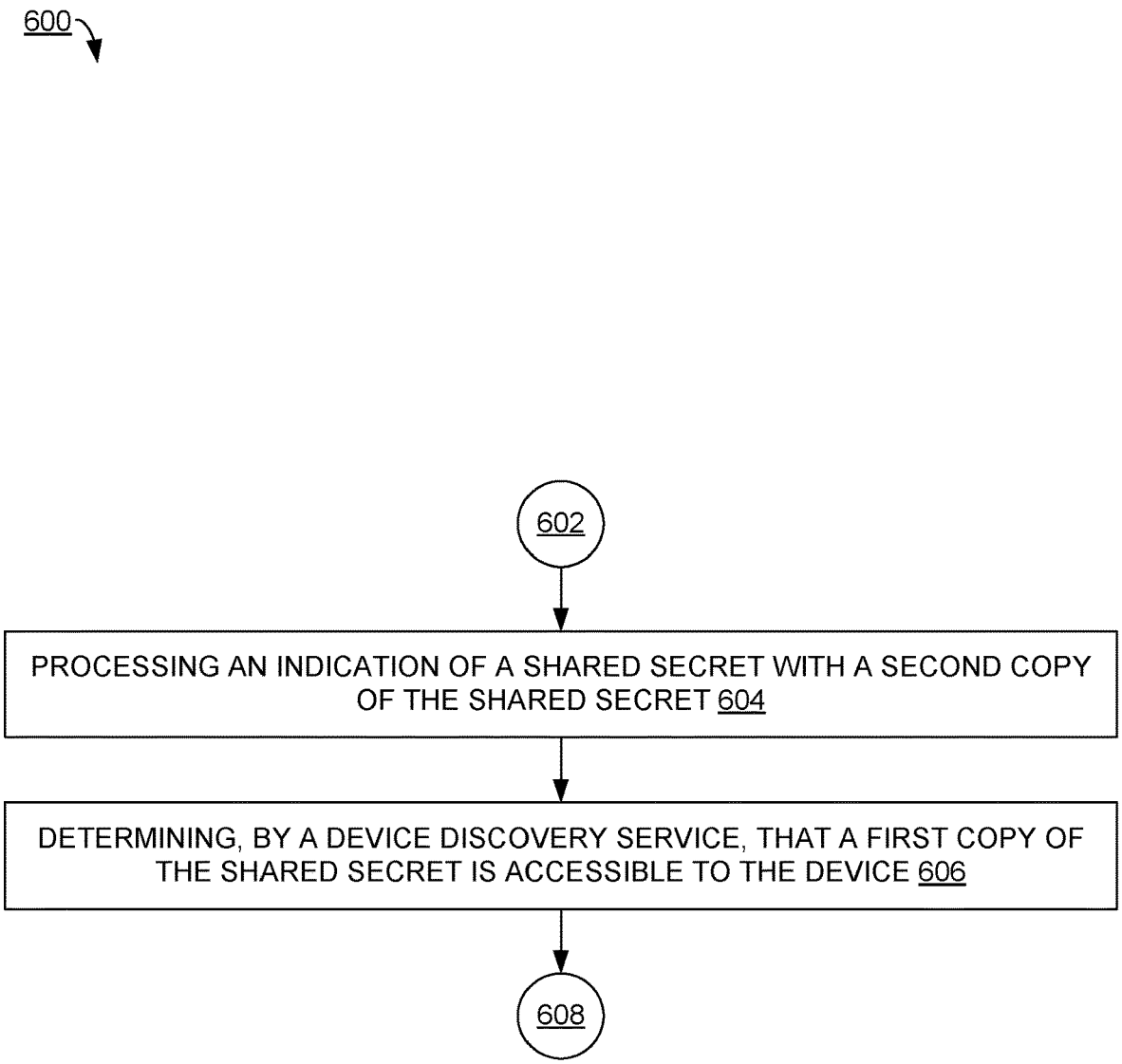
FIG. 6 illustrates another example process flow that can facilitate mitigating against spurious deliveries in device onboarding, in accordance with an embodiment of this disclosure.

FIG. 6 illustrates an example process flow 600 that can facilitate mitigating against spurious deliveries in device onboarding, in accordance with an embodiment of this disclosure. In some examples, one or more embodiments of process flow 600 can be implemented by system architecture 100 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 200 of FIG. 2, process flow 300 of FIG. 3, process flow 400 of FIG. 4, process flow 500 of FIG. 5, process flow 700 of FIG. 7, process flow 800 of FIG. 8, process flow 900 of FIG. 9, and/or process flow 1000 of FIG. 10.

Process flow 600 begins with 602, and moves to operation 604.

Operation 604 depicts processing an indication of a shared secret with a second copy of the shared secret. Using the example of FIG. 1, device discovery component 106 can receive an indication of a shared secret from device 112 as part of operation 114-5. This can be an indication of the shared secret rather than the shared secret itself because it is a hash of the shared secret.

After operation 604, process flow 600 moves to operation 606.

Operation 606 depicts determining, by a device discovery service, that a first copy of the shared secret is accessible to the device. Using the example of FIG. 1, device discovery component 106 can determine that device 112 has a copy of the shared secret where device discovery component 106 validates a hash received from device 112 against its own copy of the shared secret.

After operation 606, process flow 600 moves to 608, where process flow 600 ends.

Figure 7:
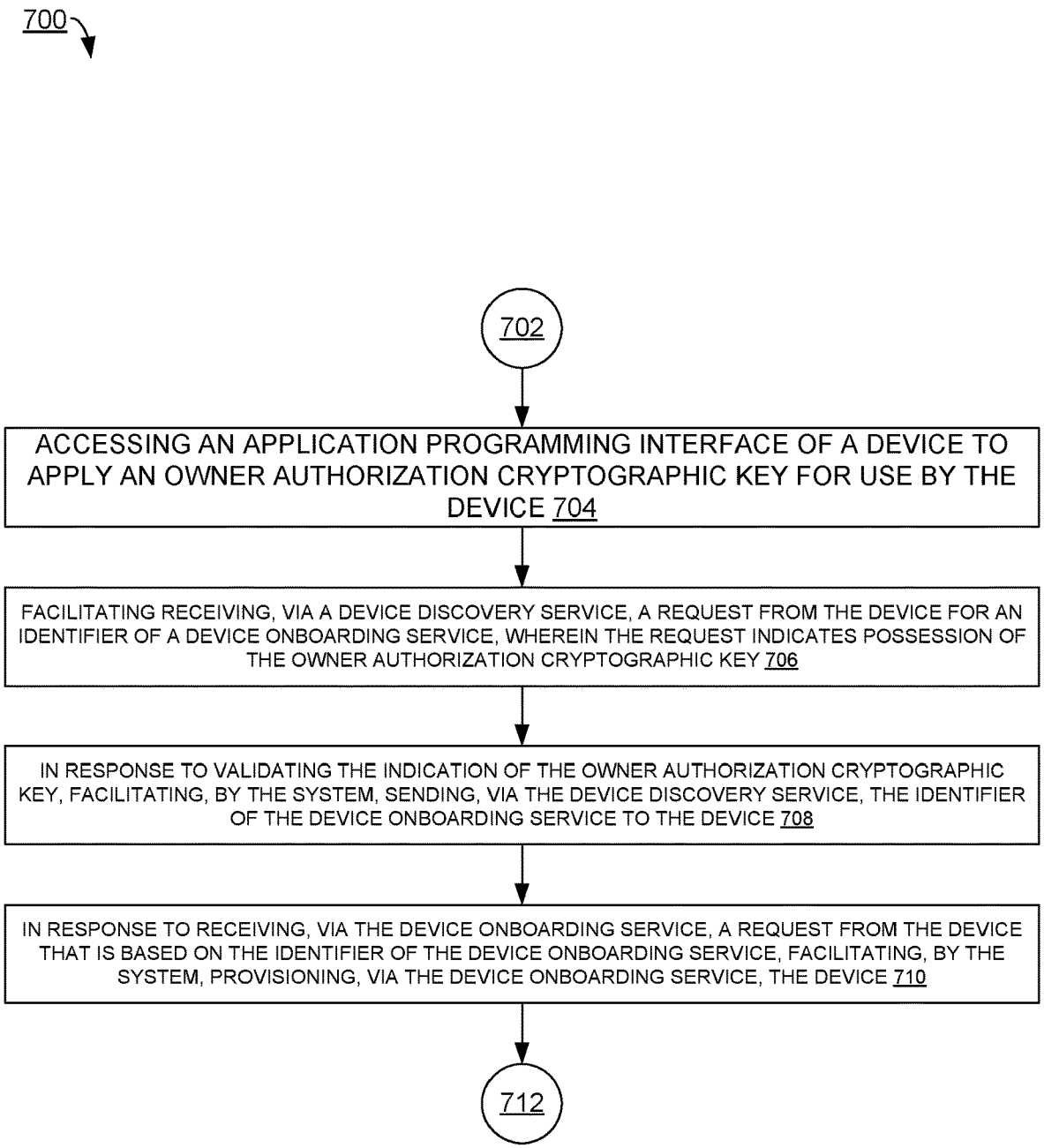
FIG. 7 illustrates another example process flow that can facilitate mitigating against spurious deliveries in device onboarding, in accordance with an embodiment of this disclosure.

FIG. 7 illustrates an example process flow 700 that can facilitate mitigating against spurious deliveries in device onboarding, in accordance with an embodiment of this disclosure. In some examples, one or more embodiments of process flow 700 can be implemented by system architecture 100 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 800 of FIG. 8, process flow 900 of FIG. 9, and/or process flow 1000 of FIG. 10.

Process flow 700 begins with 702, and moves to operation 704.

Operation 704 depicts accessing an application programming interface of a device to apply an owner authorization cryptographic key for use by the device. In some examples, operation 704 can be implemented in a similar manner as operation 504 of FIG. 5.

After operation 704, process flow 700 moves to operation 706.

Operation 706 depicts facilitating receiving, via a device discovery service, a request from the device for an identifier of a device onboarding service, wherein the request indicates possession of the owner authorization cryptographic key. In some examples, operation 706 can be implemented in a similar manner as operation 506 of FIG. 5.

In some examples, the device discovery service receives the request from the device for the identifier of the device onboarding service via a firewall that is configured to restrict the device to contacting the device discovery service and the device onboarding service. That is, a firewall can initially restrict a device to access only resources of a device discovery service and an owner onboarding service.

In some examples, the firewall is configured to prohibit the device from accessing a service that is separate from the device discovery service and the device onboarding service. That is, there can be networked resources in addition to the device discovery service and the owner onboarding service, and the firewall can initially keep a device from accessing those other services.

After operation 706, process flow 700 moves to operation 708.

Operation 708 depicts, in response to validating the indication of the owner authorization cryptographic key, facilitating sending, via the device discovery service, the identifier of the device onboarding service to the device. In some examples, operation 708 can be implemented in a similar manner as operation 508 of FIG. 5.

In some examples, a FDO protocol can require a device to demonstrate possession of a valid device private key that is created during a manufacturing process. This device private key can be separate from the cryptographic key of operation 708 (which can be an owner authorization key). It can be that a device demonstrates to a device discovery service that it has possession of both of these keys.

After operation 708, process flow 700 moves to operation 710.

Operation 710 depicts, in response to receiving, via the device onboarding service, a request from the device that is based on the identifier of the device onboarding service, facilitating provisioning, via the device onboarding service, the device. In some examples, operation 710 can be implemented in a similar manner as operation 510 of FIG. 5.

After operation 710, process flow 700 moves to 712, where process flow 700 ends.

Figure 8:
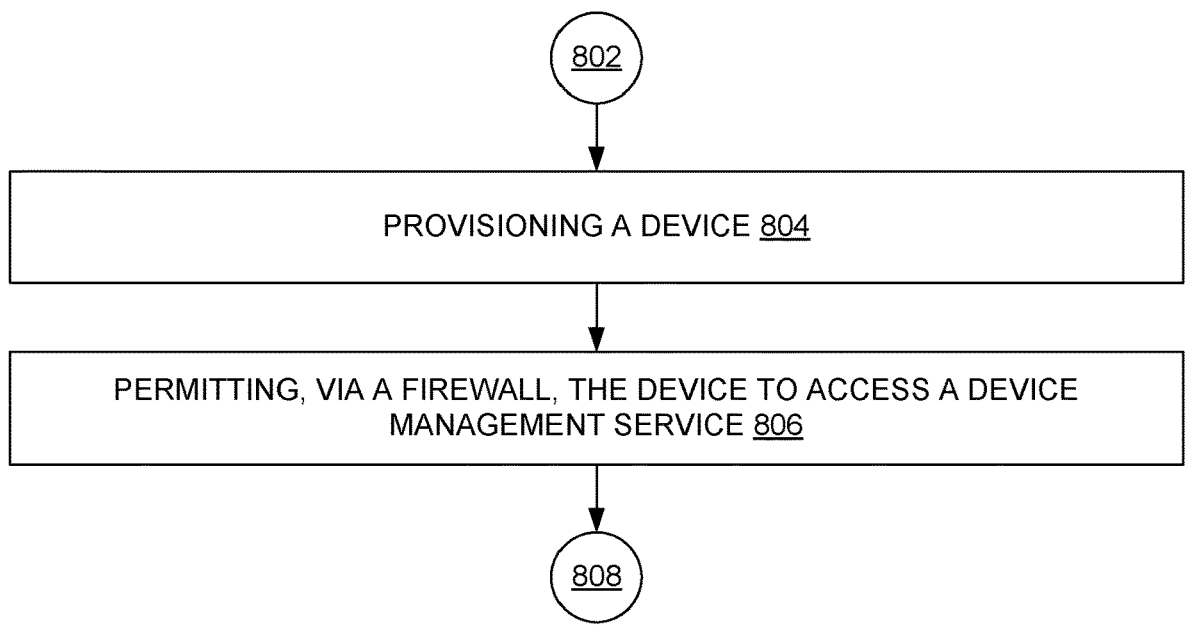
FIG. 8 illustrates another example process flow that can facilitate mitigating against spurious deliveries in device onboarding, in accordance with an embodiment of this disclosure.

FIG. 8 illustrates an example process flow 800 that can facilitate mitigating against spurious deliveries in device onboarding, in accordance with an embodiment of this disclosure. In some examples, one or more embodiments of process flow 800 can be implemented by system architecture 100 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts provisioning a device. In some examples, this can be performed similar to mitigating against spurious deliveries in device onboarding owner onboarding component 108 of FIG. 1 provisioning device 112 as part of operation 114-6.

After operation 804, process flow 800 moves to operation 806.

Operation 806 depicts permitting, via a firewall, the device to access a device management service. That is, a firewall can limit a device's access to various resources. In some examples, a firewall can initially restrict a device to accessing a device discovery service and an owner onboarding service. Then, after the device is provisioned by the owner onboarding service, the firewall can expand the resources that the device is permitted to access, such as permitting the device to access a device management component.

After operation 806, process flow 800 moves to 808, where process flow 800 ends.

Figure 9:
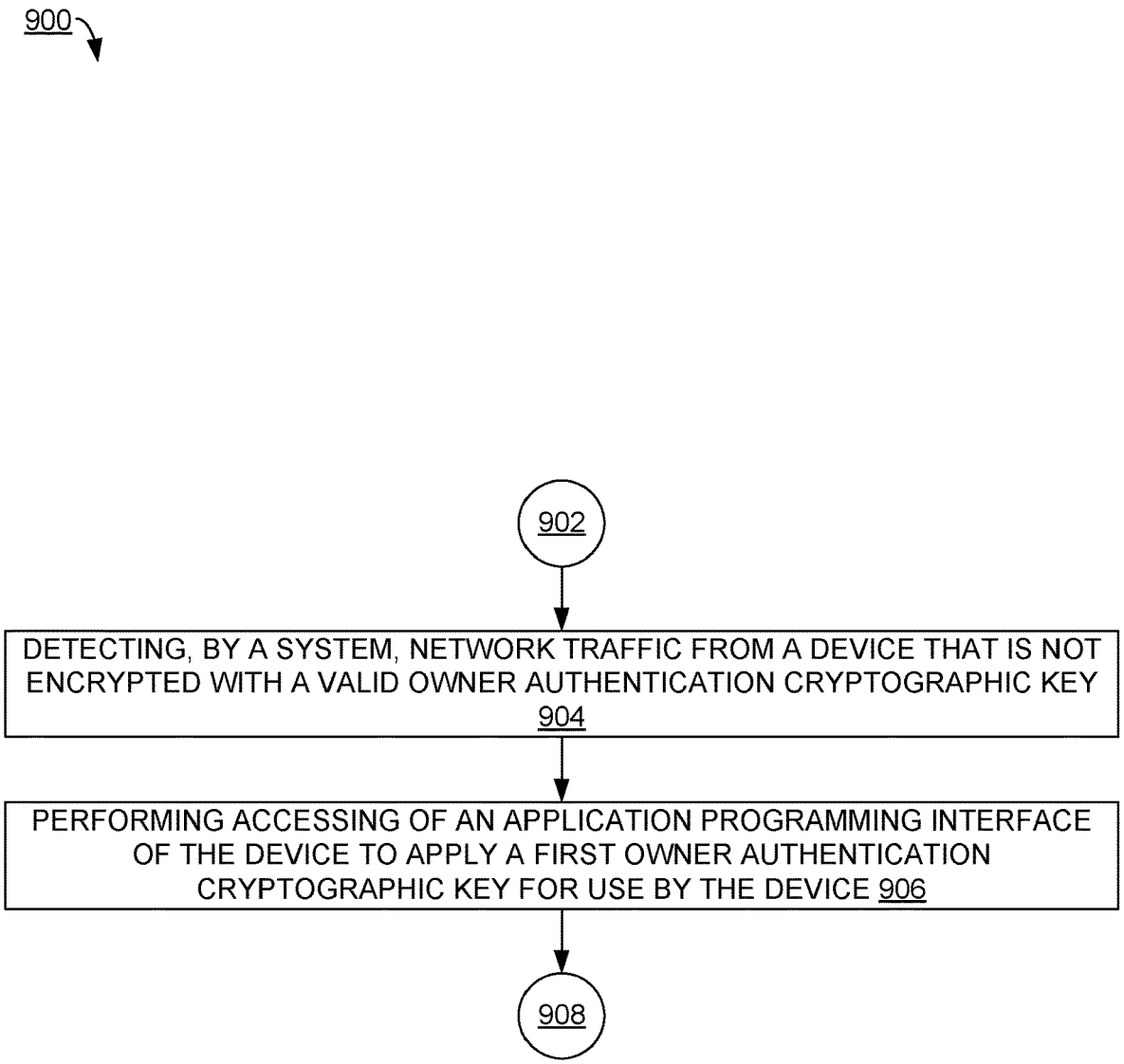
FIG. 9 illustrates an example process flow that can facilitate mitigating against spurious deliveries in device onboarding, in accordance with an embodiment of this disclosure.

FIG. 9 illustrates an example process flow 900 that can facilitate mitigating against spurious deliveries in device onboarding, in accordance with an embodiment of this disclosure. In some examples, one or more embodiments of process flow 900 can be implemented by system architecture 100 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, and/or process flow 1000 of FIG. 10.

Process flow 900 begins with 902, and moves to operation 904.

Operation 904 depicts detecting network traffic from a device that is not encrypted with a valid owner authorization cryptographic key. In some examples, the system comprises a proxy server.

That is, ins some examples, a proxy server can detect that network traffic from a device is not encrypted and signed with a correct key, which can indicate that an owner authorization key has not been set on the device.

After operation 904, process flow 900 moves to operation 906.

Operation 906 depicts performing accessing of an application programming interface of the device to apply a first owner authorization cryptographic key for use by the device. That is, in response to operation 904, the proxy server can invoke an application programming interface of the device to set an owner authorization key on the device.

After operation 906, process flow 900 moves to 908, where process flow 900 ends.

FIG. 10 illustrates an example process flow 1000 that can facilitate mitigating against spurious deliveries in device onboarding, in accordance with an embodiment of this disclosure. In some examples, one or more embodiments of process flow 1000 can be implemented by system architecture 100 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, and/or process flow 900 of FIG. 9.

Process flow 1000 begins with 1002, and moves to operation 1004.

Operation 1004 depicts receiving, via a device discovery service, a request from a device for an identifier of the device onboarding service, wherein the request indicates possession of an owner authorization cryptographic key. In some examples, operation 1004 can be implemented in a similar manner as operation 506 of FIG. 5.

In some examples, operation 1004 comprises accessing an application programming interface of the device to configure the device to use the owner authorization cryptographic key. This can be performed in a similar manner as operation 504 of FIG. 5.

In some examples, the device is a first device, a second device performs the accessing of the application programming interface of the first device to configure the first device to use the owner authorization cryptographic key, operation 1004 comprises causing a second copy of the owner authorization cryptographic key to be sent, via the second device, to the device onboarding service. That is, a copy of the owner authorization key can be loaded onto the owner onboarding service.

In some examples, the device onboarding service validates the first device based on the second copy of the owner authorization cryptographic key before provisioning the first device. That is, an owner onboarding service can use a copy of an owner authorization key that has been loaded onto it to validate a device.

In some examples, the indication of the owner authorization cryptographic key is a first indication of the owner authorization cryptographic key, and wherein the device onboarding service validates the first device based on receiving a second indication of the owner authorization cryptographic key from the first device. That is, the owner onboarding service can use a hash (that is produced with a copy of an owner authorization key) from the device to validate the device.

In some examples, the device discovery service receives the request from the device via a firewall that is configured to restrict the device to contacting the device discovery service and the device onboarding service.

After operation 1004, process flow 1000 moves to operation 1006.

Operation 1006 depicts, in response to validating the indication of the owner authorization cryptographic key, sending, via the device discovery service, the identifier of the device onboarding service to the device. In some examples, operation 1006 can be implemented in a similar manner as operation 508 of FIG. 5.

After operation 1006, process flow 1000 moves to operation 1008.

Operation 1008 depicts, in response to receiving, via the device onboarding service, a request from the device that is based on the identifier of the device onboarding service, provisioning, via a device onboarding service, the device. In some examples, operation 1008 can be implemented in a similar manner as operation 510 of FIG. 5.

After operation 1008, process flow 1000 moves to 1010, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of device manufacturer 102, cloud services platform 104, device discovery component 106, mitigating against spurious deliveries in device onboarding owner onboarding component 108, management component 110, and/or device 112 of FIG. 1.

In some examples, computing environment 1100 can implement one or more embodiments of the process flows of FIGS. 2-10 to facilitate mitigating against spurious deliveries in device onboarding.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory coupled to the processor, comprising instructions that cause the processor to perform operations comprising:
accessing an application programming interface of a device to set an owner authorization cryptographic key on the device;
receiving, at a device discovery service of the system and via a firewall that restricts the device to contacting the device discovery service and a device onboarding service of the system based on indication of device possession of the owner authorization cryptographic key, a first request from the device for an identifier of the device onboarding service, wherein the first request comprises an indication of possessing the owner authorization cryptographic key;
in response to validating the indication of the owner authorization cryptographic key, sending, by the device discovery service, the identifier of the device onboarding service to the device;
in response to receiving, at the device onboarding service, a second request from the device that is based on the identifier of the device onboarding service and demonstrates possession of the owner authorization cryptographic key, provisioning the device by the device onboarding service; and
in response to provisioning the device, permitting, via the firewall, the device to access a device management service.

2. The system of claim 1, wherein the owner authorization cryptographic key comprises a first copy of a shared secret, and wherein the device discovery service stores a second copy of the shared secret.

3. The system of claim 2, wherein validating the indication of the owner authorization cryptographic key comprises:
determining, by the device discovery service, that the first copy of the shared secret is accessible to the device based on processing the indication of the shared secret with the second copy of the shared secret.

4. The system of claim 2, wherein the indication of the shared secret comprises a result of processing the first copy of the shared secret with a hash.

5. The system of claim 2, wherein the device is a first device, wherein a second device performs the accessing of the application programming interface of the first device to set the first copy of the shared secret on the first device, and wherein the operations further comprise:
receiving, by the device discovery service, the second copy of the shared secret from the second device.

6. The system of claim 1, wherein validating the indication of the owner authorization cryptographic key is performed according to a keyed-hash message authentication code approach.

7. The system of claim 1, wherein accessing the application programming interface of the device to set the owner authorization cryptographic key on the device comprises:
sending a message to the application programming interface that identifies a uniform resource locator of the device and the owner authorization cryptographic key.

8. The system of claim 1, wherein accessing the application programming interface of the device to set the owner authorization cryptographic key on the device is performed via a curl command.

9. A method, comprising:
accessing, by a system comprising a processor, an application programming interface of a device to apply an owner authorization cryptographic key for use by the device;
facilitating, by the system, receiving, via a device discovery service, a request from the device for an identifier of a device onboarding service, wherein the request indicates possession of the owner authorization cryptographic key;
in response to validating the indication of the owner authorization cryptographic key, facilitating, by the system, sending, via the device discovery service, the identifier of the device onboarding service to the device; and
in response to receiving, via the device onboarding service, a request from the device that is based on the identifier of the device onboarding service, facilitating, by the system, provisioning, via the device onboarding service, the device.

10. The method of claim 9, wherein the device discovery service receives the request from the device for the identifier of the device onboarding service via a firewall that is configured to restrict the device to contacting the device discovery service and the device onboarding service.

11. The method of claim 10, wherein the firewall is configured to prohibit the device from accessing a service that is separate from the device discovery service and the device onboarding service.

12. The method of claim 10, further comprising:
in response to provisioning the device, facilitating, by the system, permitting, via the firewall, the device to access a device management service.

13. The method of claim 9, wherein the owner authorization cryptographic key is a first owner authentication cryptographic key, further comprising:
performing the accessing of the application programming interface of the device to apply the first owner authentication cryptographic key for use by the device based on detecting, by the system, network traffic from the device that is not encrypted with a valid owner authorization cryptographic key.

14. The method of claim 13, wherein the system comprises a proxy server.

15. A non-transitory computer-readable medium comprising instructions that, in response to execution, cause a system comprising a processor and communicatively couple to a device discovery service and a device onboarding service, to perform operations, comprising:
receiving, via the device discovery service, a request from a device for an identifier of the device onboarding service, wherein the request indicates possession of an owner authorization cryptographic key;
in response to validating the indication of the owner authorization cryptographic key, sending, via the device discovery service, the identifier of the device onboarding service to the device; and
in response to receiving, via the device onboarding service, a request from the device that is based on the identifier of the device onboarding service, provisioning, via the device onboarding service, the device.

16. The non-transitory computer-readable medium of claim 15, wherein the operations further comprise:
accessing an application programming interface of the device to configure the device to use the owner authorization cryptographic key.

17. The non-transitory computer-readable medium of claim 16, wherein the device is a first device, wherein a second device performs the accessing of the application programming interface of the first device to configure the first device to use the owner authorization cryptographic key, and wherein the operations further comprise:
   causing a second copy of the owner authorization cryptographic key to be sent, via the second device, to the device onboarding service.

18. The non-transitory computer-readable medium of claim 17, wherein the device onboarding service validates the first device based on the second copy of the owner authorization cryptographic key before provisioning the first device.

19. The non-transitory computer-readable medium of claim 18, wherein the indication of the owner authorization cryptographic key is a first indication of the owner authorization cryptographic key, and wherein the device onboarding service validates the first device based on receiving a second indication of the owner authorization cryptographic key from the first device.

20. The non-transitory computer-readable medium of claim 15, wherein the device discovery service receives the request from the device via a firewall that is configured to restrict the device to contacting the device discovery service and the device onboarding service.

* * * * *